Patented Jan. 6, 1953

2,624,719

UNITED STATES PATENT OFFICE 2,624,719

HEAT STABILIZED MOLDING COMPOSITIONS OF VINYL AROMATIC POLYMERS AND METHOD OF MAKING THE SAME

Arthur F. Roche, Freeland, and Raymond M. Price, Midland, Mich., assignors to The Dow Chemical Company, Midland, Mich., a corporation of Delaware No Drawing. Application March 31, 1950, Serial No. 153,302

13 Claims. (Cl. 260—45.95)

This invention concerns improved molding compositions comprising a thermoplastic monovinyl aromatic polymer having incorporated therewith a stabilizing agent for suppressing the tendency toward discoloring of the polymer on heating the same to high temperatures during usual injection and compression molding operations. It pertains especially to molding compositions composed essentially of polystyrene and a minor proportion of an aliphatic monohydric alcohol, a dihydric alcohol, or an ether-alcohol containing a secondary hydroxyl group and relates to a method of making the same.

When a thermoplastic monovinyl aromatic polymer such as polystyrene is heated to temperatures above its melting point, e. g. to temperatures between 220° and 300° C., such as is commonly used in molding the granular polymer by usual injection molding procedure, the molded articles frequently possess a yellow color and fluorescence which is displeasing to the eye. The formation of such color in the polymer results in a relatively large proportion of the molded articles being rejected as waste, or scrap material, which latter material cannot be recovered, or reworked, except into molded articles wherein the undesirable color is masked by pigments, or other coloring agents. The small amount, i. e. traces, of air, or oxygen, entrapped in the granular polystyrene, when a charge of the molding powder is fed into an injection molding machine, appears to be sufficient to cause discoloration of the polystyrene when the latter is heat-plastified, or is heated to temperatures above its melting point, and is subsequently molded to form a shaped article of manufacture.

It has also been observed that polystyrene frequently possesses an undesirable color and fluorescence when monomeric styrene is polymerized in bulk by usual manner, e. g. by heating the same to a temperature between 80° and 150° C., until the polymerization is about 90 per cent complete, and the mass is thereafter heated to a higher temperature such as a temperature of from 200° to 260° C. to polymerize the remaining portion of the monomeric materials. The color is usually concentrated in the polymer near the surface in contact with vapor, or any gases, in the polymerization vessel and appears to be dependent for the most part upon the amount of air, or oxygen, in contact with, or dissolved in, the monomers being polymerized.

It is accordingly an object of the invention to provide a method for producing a monovinyl aromatic polymer free of color. It is another object to provide a method for suppressing the tendency toward the formation of color in thermoplastic monovinyl aromatic polymers when heated to high temperatures in the presence of traces of air or oxygen. Still another object is to provide a method of making substantially colorless molded articles from thermoplastic monovinyl aromatic resins. Another object is to provide molding compositions comprising monovinyl aromatic polymers which compositions are stable to discoloration when molded by usual injection molding operations. A further object is to prepare molding compositions comprising polystyrene and an aliphatic monohydric or dihydric alcohol, or a monohydric or dihydric ether-alcohol, containing a secondary hydroxyl group, which compositions can be molded to form clear colorless articles. Other and related objects will become apparent from the following description of the invention.

According to the invention, the tendency of a thermoplastic monovinyl aromatic polymer, e. g. polystyrene, toward discoloring upon heating the same to temperatures above its melting point in the presence of traces of air or oxygen can be completely suppressed, or substantially reduced, by incorporating with the polymer a minor, but effective, amount of an acyclic organic compound composed of carbon, hydrogen and oxygen atoms, which compound is a saturated aliphatic monohydric or dihydric alcohol, or an acyclic ether-alcohol, containing a secondary hydroxyl group, i. e. having an hydroxyl group attached to a secondary carbon atom in the molecule, as hereinafter specified.

The acyclic alcohol, or ether-alcohol to be employed should be a saturated aliphatic monohydric or dihydric alcohol, or a monohydric or dihydric ether-alcohol containing an hydroxyl group attached to a secondary carbon atom in the molecule, which compound is composed only of carbon, hydrogen and oxygen atoms and has a molecular weight of not more than 300, preferably a molecular weight between 60 and 280. Examples of suitable compounds are isopropyl alcohol, 2-pentanol, 2-octanol, 1,2-propylene glycol, dipropylene glycol, tripropylene glycol, tetrapropylene glycol, mono-isobutyl ether of propylene glycol, monopropyl ether of dipropylene glycol, monomethyl ether of tripropylene glycol, mono-methyl ether of tetrapropylene glycol and 3-ethoxy-1,2-propane diol. Mixtures of any of the above compounds with each other may also be used.

The acyclic ether-alcohols may be formed by the reaction of 1,2-propylene oxide with a monohydroxy compound such as methanol, ethanol, isopropanol, butanol, octanol, cyclohexanol, or benzyl alcohol, in the presence of an alkaline catalyst, e. g. sodium or potassium hydroxide. The acyclic dihydric alcohols, e. g. 1,2-propylene glycol and polypropylene glycols, may be formed in known manner by reaction of 1,2-propylene oxide with water and with the amount of propylene oxide controlled to produce the desired compounds. In this connection it may be mentioned that in the case of the mono-ethers of 1,2-propylene glycol and the polypropylene glycols, it is probable that the reaction product is a mixture consisting of compounds containing an hydroxyl group attached to a primary carbon atom and compounds containing an hydroxyl group attached to a secondary carbon atom in the molecule. Also, the polypropylene glycols are probably a mixture of compounds containing two primary hydroxyl groups, or two secondary hydroxyl groups, as well as compounds containing both a primary and a secondary hydroxyl group, in the molecule. In general, the polypropylene glycols and mono-ethers of 1,2-propylene glycol and polypropylene glycols just described, consist principally of compounds containing an hydroxyl group attached to a secondary carbon atom in the molecule when prepared by reaction of 1,2-propylene oxide with water, or a monohydroxy compound, in the presence of an alkali catalyst such as sodium hydroxide or potassium hydroxide. Accordingly, the acyclic alcohol or ether-alcohol to be employed in preparing the molding compositions is selected from the group consisting of saturated aliphatic, or open-chain alcohols, and ether-alcohols composed of carbon, hydrogen and oxygen atoms, which compound has a molecular weight of not more than 300 and contains an hydroxyl group attached to a secondary carbon atom in the molecule. Such compounds are herein referred to as "acyclic secondary-alcohols and ether-alcohols."

The proportion of the acyclic alcohol or ether-alcohol to be employed should not exceed the solubility of the aliphatic compound in the solid polymer in order to obtain clear transparent moldings and also to avoid deleterious effect on other important characteristics of the polymer, e. g. lowering of the heat distortion temperature. The acyclic alcohol or ether-alcohol may be employed in amounts of from 0.04 to 3 per cent by weight of the polymer used, but an amount of the acyclic compound corresponding to from 0.1 to 2 per cent of the polymer is preferred.

Polystyrene of molding quality, e. g. having a molecular weight of from 70,000 to 150,000, is the preferred monovinyl aromatic polymer although the solid thermoplastic polymers and copolymers of other monovinyl aromatic compounds such as para - methylstyrene, meta - ethylstyrene, ortho, para-dimethylstyrene, ortho, para-diethylstyrene, or copolymers of any of these compounds with styrene may be used. The term "monovinyl aromatic polymer" as used in the specification and claims is intended to include such solid thermoplastic polymers and copolymers of monovinyl aromatic compounds having the vinyl radical directly attached to a carbon atom of a benzene nucleus.

The molding compositions may be prepared by incorporating the acyclic alcohol, or the ether-alcohol, with the monomeric styrene, or mixture of styrene and other polymerizable monovinyl aromatic compound, and thereafter polymerizing the mixture in usual manner in the presence or absence of a polymerization catalyst, by heating the mixture in bulk, i. e. in the substantial absence of inert liquid media, until the monomers are nearly all polymerized, e. g. until a solid polymer containing less than 2 per cent of unreacted monomers is obtained. The acyclic alcohol or ether-alcohol may also be mixed with the granular monovinyl aromatic polymer, preferably polystyrene, and the mixture agitated until the added ingredient is uniformly distributed over surfaces of the polymer granules. The alcohol or ether-alcohol is advantageously mixed with the granular polymer just prior to use of the composition for molding into finished articles, since an acyclic alcohol or ether-alcohol of relatively low molecular weight such as isopropyl alcohol, 1,2-propylene glycol, or monoethyl ether of 1,2-propylene glycol, may become unevenly distributed throughout a bed of the polymer granules upon prolonged storage. The molding compositions may also be prepared by heating a mixture of a granular thermoplastic monovinyl aromatic resin and an acyclic secondary alcohol or ether-alcohol to a heat-plastifying temperature and agitating the mixture by a stirring, rolling or extruding action and thereafter cooling the mixture.

The following examples illustrate ways in which the principle of the invention has been applied, but are not to be construed as limiting the invention.

*Example 1*

In each of a series of experiments, a charge of powdered molding grade polystyrene, together with isopropyl alcohol in amounts as stated in the following table, was sealed in a glass tube 12 inches long having an internal diameter of 0.5 inch. The tubes were sealed without evacuating so that air occupied the free space therein. The sealed tubes were heated to a temperature of 275° C. over a period of 24 hours, then cooled to room temperature and the color of the polymer observed. The polystyrene was melted and had solidified on cooling into a clear solid mass. In Table I there is stated the amount of the isopropyl alcohol used in per cent by weight, based on the combined weight of the polystyrene and isopropyl alcohol, together with the color of the polymer after heating.

TABLE I

| Run No. | Weight polystyrene, gms. | Percent isopropyl alcohol | Temp., ° C. | Time, hours | Color of polymer |
| --- | --- | --- | --- | --- | --- |
| 1 | 2 | 0 | 275 | 24 | Yellow. |
| 2 | 4 | .75 | 275 | 24 | Light yellow. |
| 3 | 4 | 1.5 | 275 | 24 | Light yellow. |
| 4 | 4 | 3.0 | 275 | 24 | Colorless. |

*Example 2*

In each of a series of experiments, a charge consisting of 83 grams of monomeric styrene, together with isopropyl alcohol in amount indicated in the table, was sealed in a glass tube 12 inches long having an internal diameter of 1.25 inches, without evacuating. The styrene was polymerized by heating the sealed tubes to a temperature of 126° C., over a period of 48 hours. Thereafter, the temperature was raised to 250° C. and the polymer heated for a period of 72 hours, then cooled. The polymer from each of the experiments was removed from the tube, crushed to a size suitable for molding and molded into test plates having a thickness of 0.25 inch. The per cent of yellowness, or color in the polymer, was determined by measuring the per cent of light transmitted through the plates at wave lengths of 620 millimicrons and 420 millimicrons, respectively. Table II states the per cent of isopropyl alcohol used, based on the combined weight of the monomeric styrene and the isopropyl alcohol starting materials, the polymerizing temperature and the conditions of time and temperature for which the polymer was heat treated. The table also states the per cent of color in the polymer as the difference between the amount of light transmitted through the plate at each wave length divided by the per cent of light transmitted through the plate at a wave length of 620 millimicrons.

TABLE II

| Run No. | Percent isopropyl alcohol | Polymerization | | Heat treatment | | Percent color in polymer |
|---|---|---|---|---|---|---|
| | | Temp., °C. | Time, hours | Temp., °C. | Time, hours | |
| 1 | 0 | 126 | 48 | 250 | 72 | 30.6 |
| 2 | .17 | 126 | 48 | 250 | 72 | 17.2 |
| 3 | .34 | 126 | 48 | 250 | 72 | 16.1 |
| 4 | .68 | 126 | 48 | 250 | 72 | 13.2 |

*Example 3*

In each of a series of experiments, a charge of 10 grams of a granular polystyrene molding powder, together with 0.05 gram of an acyclic secondary ether-alcohol as stated in the following table, was sealed in a glass tube 12 inches long having an internal diameter of 0.5 inch, without evacuating. The sealed tubes were heated to a temperature of 300° C. over a period of 24 hours, then cooled. The polymer was melted and had solidified on cooling to form a solid mass. The color of the solid body of polymer from each of the experiments was observed. In Table III there is named the acyclic ether-alcohol employed, the conditions of time and temperature for which the polymer was heat treated, together with the observed color of the heat treated polymer. For purpose of comparison, polystyrene alone was heat treated under similar conditions of time and temperature.

TABLE III

| Run No. | Acyclic secondary ether-alcohol | Heat treatment | | Color of polymer |
|---|---|---|---|---|
| | | Temp., °C. | Time, hours | |
| 1 | None | 300 | 24 | Yellow. |
| 2 | 1,2-propylene glycol monoisobutyl ether. | 300 | 24 | Very light yellow. |
| 3 | Dipropylene glycol mono-normal propyl ether. | 300 | 24 | Light yellow. |
| 4 | Tetrapropylene glycol mono-methyl ether. | 300 | 24 | Very light yellow. |

*Example 4*

In each of a series of experiments, a charge consisting of 30 grams of powdered polystyrene, together with 1.5 per cent by weight (0.45 gram) of a secondary aliphatic alcohol as stated in the table, was sealed in a glass tube 12 inches long having an internal diameter of 1.25 inches. The tubes were sealed without evacuating so that air occupied the free space therein. The sealed tubes were heated to a temperature of 295° C. over a period of about 16 hours, then cooled. The polymer from each of the experiments was removed from the tube and crushed to a granular form. A portion of each polymer was dissolved in toluene to form a solution containing 10 weight per cent of the polymer. The per cent color of the polymer was determined by measuring the per cent of light transmitted through the solution in a standard cell at wave lengths of 620 millimicrons and 420 millimicrons, respectively. In Table IV the per cent of color in the polymer is stated as the difference between the per cent of light transmitted through the solution at the respective wave lengths divided by the per cent of light transmitted at a wave length of 620 millimicrons. The table also names the secondary aliphatic alcohol employed and states the time and temperature conditions for which the polymer was heated. The experiments were made in duplicate. The results reported are the average of two runs.

TABLE IV

| Run No. | Aliphatic secondary alcohol | Temp., °C. | Time, hours | Percent color in polymer |
|---|---|---|---|---|
| 1 | None | 295 | 16 | 85.7 |
| 2 | Isopropyl alcohol | 295 | 16 | 47.7 |
| 3 | 2-pentanol | 295 | 16 | 40.5 |
| 4 | 2-octanol | 295 | 16 | 41.6 |

*Example 5*

In each of a series of experiments, 30 grams of powdered polystyrene, together with 1.5 per cent by weight (0.45 gram) of a mono- or poly-propylene glycol as stated in the table, was sealed in a glass tube 12 inches long having an internal diameter of 1.25 inches. The tubes were sealed without evacuating so that air occupied the free space therein. The sealed tubes were heated to a temperature of about 294° C. over a period of 17 hours, then cooled. The polymer from each of the experiments was removed from the tube and crushed to granular form. A portion of each polymer was dissolved in toluene to form a solution containing 10 weight per cent of the polymer. The color of the polymer was determined by measuring the per cent of light transmitted through the solution in a standard cell at wave lengths of 620 millimicrons and 420 millimicrons, respectively. In Table V the per cent of color in the polymer is stated as the difference between the per cent of light transmitted through the solution at the respective wave lengths divided by the per cent of light transmitted at a wave length of 620 millimicrons. The table also names the acyclic glycol employed. For purpose of comparison compositions employing polypropylene glycols that are outside the scope of the invention are also included in the table. The experiments were made in duplicate. The results reported are the average of two runs.

TABLE V

| Run No. | Glycol | Molecular weight of glycol | Percent glycol | Percent color in polymer |
|---|---|---|---|---|
| 1 | None | | 0 | 85.8 |
| 2 | 1,2-propylene glycol | 76 | 1.5 | 46.6 |
| 3 | Tripropylene glycol | 192 | 1.5 | 56.0 |
| 4 | Polypropylene glycol | 304 | 1.5 | 74.5 |
| 5 | ----do---- | 400 | 1.5 | 76.7 |
| 6 | ----do---- | 750 | 1.5 | 78.6 |

*Example 6*

A charge consisting of 90 pounds of styrene monomer and 0.27 pound of isopropyl alcohol, together with 0.03 per cent of benzoyl peroxide, based on the weight of styrene, as polymerization catalyst was sealed in a closed container and polymerized in accordance with the following schedule of time and temperature conditions: 75° C. for 64 hours; 95° C. for 8 hours; and 200° C. for 48 hours. The polymer was removed from the container and crushed to a size suitable for molding. The granular polymer was molded into plates having the dimensions 5 inches x 5 inches x ⅛ inch thick, by usual injection molding procedure. During the molding operation the polymer was heated to a temperature of 550° F. for a time of approximately 5 minutes. The molded articles were examined for color by comparison with a standard which was substantially colorless. In a series of moldings 87 per cent of the molded articles were acceptable as meeting the standard for freedom from color.

A granular polystyrene prepared by polymerizing the monomeric styrene under similar time and temperature conditions, except in the absence of isopropyl alcohol, was injection molded to form a series of similar moldings. The procedure and the conditions of time and temperature employed in the molding operations were as stated above. Only 73.7 per cent of the molded plates were as free from color as the standard.

*Example 7*

A charge consisting of 30 grams of granular molding grade polystyrene, together with 1.5 per cent by weight (0.45 gram) of 3-ethoxy-1,2-propane diol, was sealed in a glass tube 12 inches long having an internal diameter of 1.25 inches. The tube was sealed without evacuating so that air occupied the free space therein. The tube was heated to a temperature of 288° C., over a period of 16 hours, then cooled. The polymer was removed from the tube and crushed to a powder. A portion of the polymer was dissolved in toluene to form a solution containing 10 weight per cent of the polymer. The percent color of the polymer was determined as in Example 4. The polymer was found to have a color of 55.6 per cent. For purpose of comparison, 30 grams of the granular polystyrene alone, was heated under similar conditions of time and temperature. It had a color corresponding to 75.4 per cent.

Other modes of applying the principle of the invention may be employed instead of those explained, change being made as regards the composition or steps herein employed, provided the composition or steps stated in any of the following claims or the equivalent of such composition or steps be employed.

We claim:

1. A molding composition comprising essentially a thermoplastic monovinyl aromatic polymer of a monovinyl aromatic compound having the vinyl radical directly attached to a carbon atom of a benzene nucleus together with from 0.04 to 3 per cent by weight of an acyclic organic compound selected from the group consisting of aliphatic secondary alcohols and ether-alcohols composed of C, H, and O atoms, which compound has a molecular weight of less than 300 and contains an hydroxyl group attached to a secondary carbon atom in the molecule.

2. A molding composition comprising essentially polystyrene having incorporated therewith from 0.1 to 2 per cent by weight of an acyclic organic compound selected from the group consisting of aliphatic secondary alcohols and ether-alcohols composed of C, H, and O atoms, which compound has a molecular weight between 60 and 280 and contains an hydroxyl group attached to a secondary carbon atom in the molecule.

3. A molding composition comprising essentially polystyrene having incorporated therewith from 0.1 to 2 per cent by weight of isopropyl alcohol.

4. A molding composition comprising essentially polystyrene having incorporated therewith from 0.1 to 2 per cent by weight of 2-pentanol.

5. A molding composition comprising essentially polystyrene having incorporated therewith from 0.1 to 2 per cent by weight of 1,2-propylene glycol.

6. A molding composition comprising essentially polystyrene having incorporated therewith from 0.1 to 2 per cent by weight of tripropylene glycol.

7. A method of making substantially colorless molded articles from a solid thermoplastic monovinyl aromatic polymer of a monovinyl aromatic compound having the vinyl radical directly attached to a carbon atom of a benzene nucleus which consists of incorporating with the polymer from 0.1 to 2 per cent by weight of an acyclic organic compound selected from the group consisting of aliphatic secondary alcohols and ether-alcohols composed of C, H, and O atoms, which compound has a molecular weight between 60 and 280 and contains an hydroxyl group attached to a secondary carbon atom in the molecule and thereafter subjecting the polymer to molding operations.

8. A method of suppressing the tendency toward discoloring of polystyrene when heated to temperatures above its melting point in the presence of traces of oxygen which consists of incorporating with monomeric styrene from 0.1 to 2 per cent by weight of an acyclic organic compound selected from the group consisting of aliphatic secondary alcohols and ether-alcohols composed of C, H, and O atoms, which compound has a molecular weight between 60 and 250 and contains an hydroxyl group attached to a secondary carbon atom in the molecule, and polymerizing the styrene in the substantial absence of inert liquid media to form a solid polymeric product.

9. A method as claimed in claim 8 wherein the acyclic organic compound is isopropyl alcohol.

10. A method as claimed in claim 8 wherein the acyclic organic compound is 2-octanol.

11. A method as claimed in claim 8 wherein the acyclic organic compound is 1,2-propylene glycol.

12. A method as claimed in claim 8 wherein the acyclic organic compound is tripropylene glycol.

13. A method as claimed in claim 8 wherein the acyclic organic compound is 2-pentanol.

ARTHUR F. ROCHE.
RAYMOND M. PRICE.

REFERENCES CITED

The following references are of record in the file of this patent:

UNITED STATES PATENTS

| Number | Name | Date |
|---|---|---|
| 2,459,746 | Radcliffe | Jan. 18, 1949 |